(No Model.) 6 Sheets—Sheet 1.
S. E. JACKMAN.
INCLINED RAILWAY AND WATER TOBOGGANING APPARATUS.
No. 566,182. Patented Aug. 18, 1896.
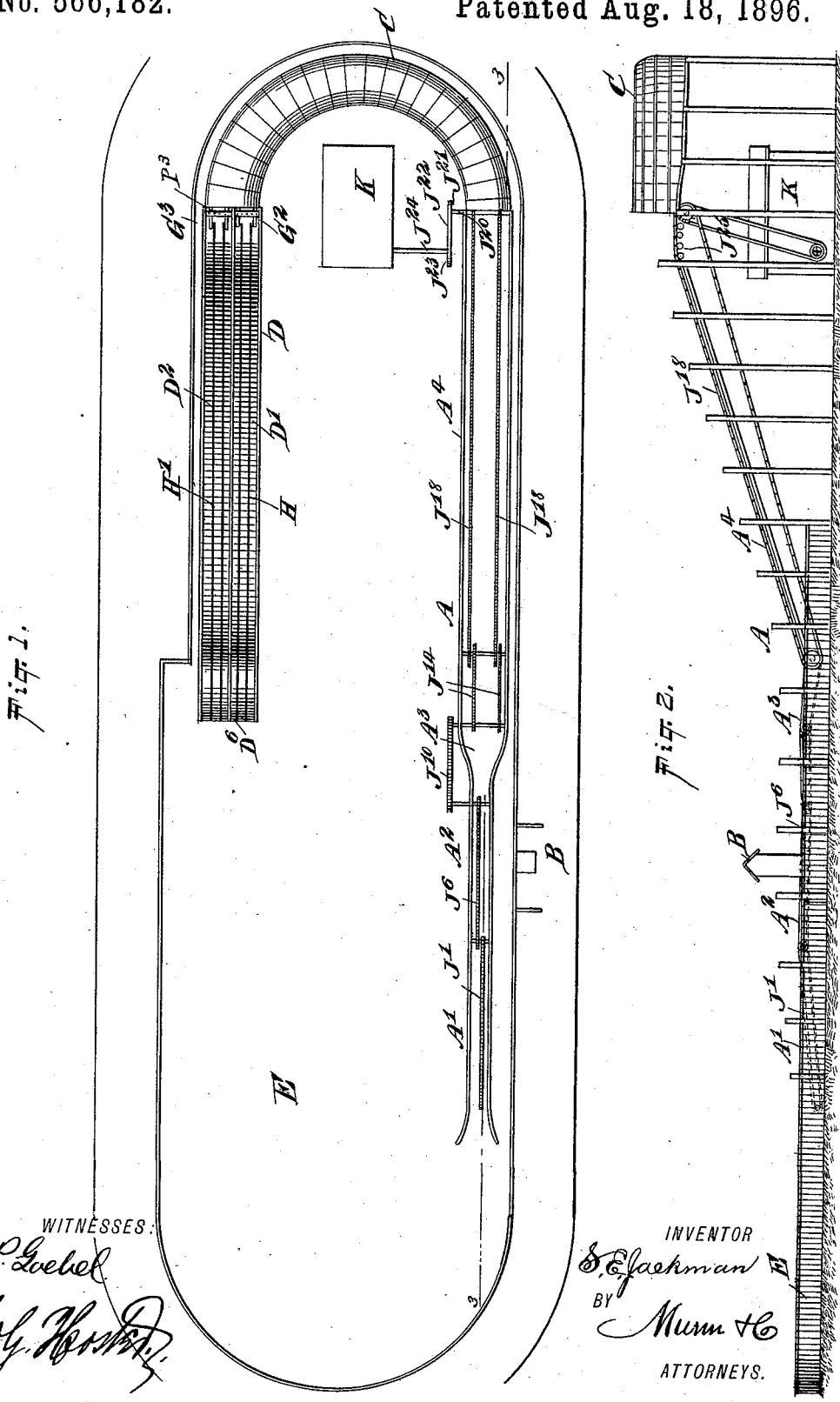
WITNESSES:
INVENTOR
S. E. Jackman
BY
Munn & Co.
ATTORNEYS.

(No Model.) 6 Sheets—Sheet 2.
S. E. JACKMAN.
INCLINED RAILWAY AND WATER TOBOGGANING APPARATUS.
No. 566,182. Patented Aug. 18, 1896.
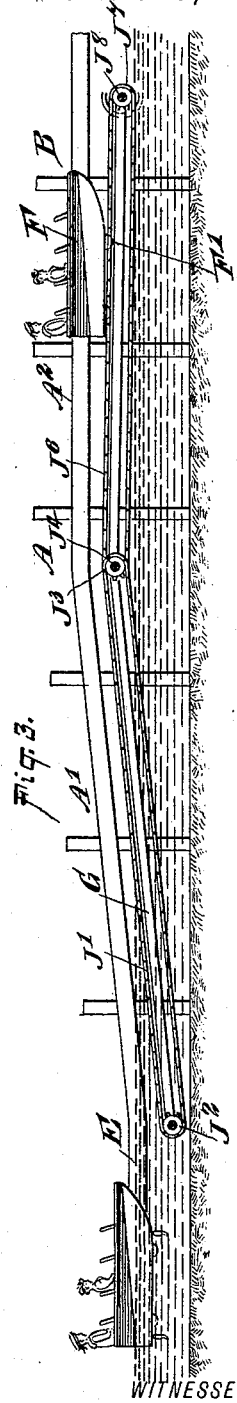
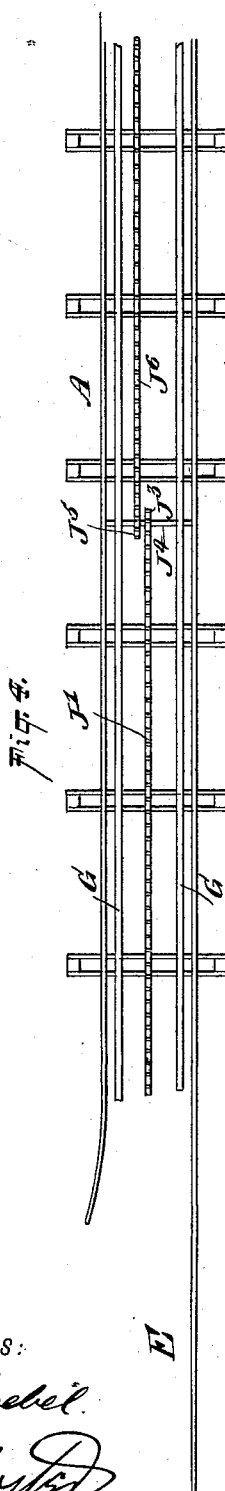
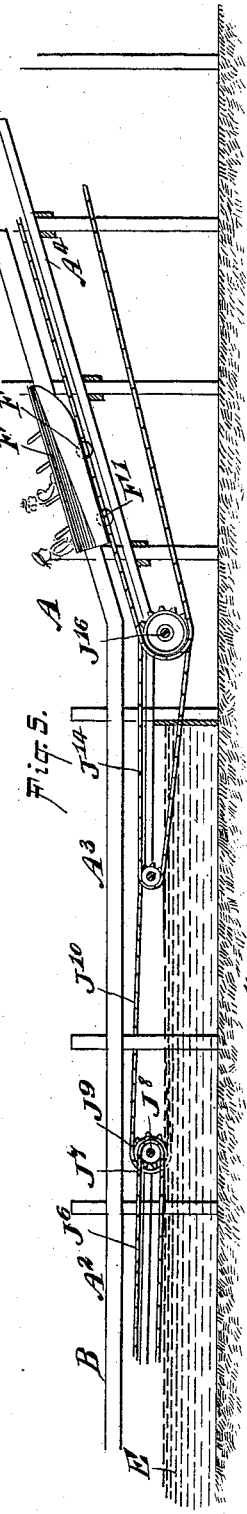
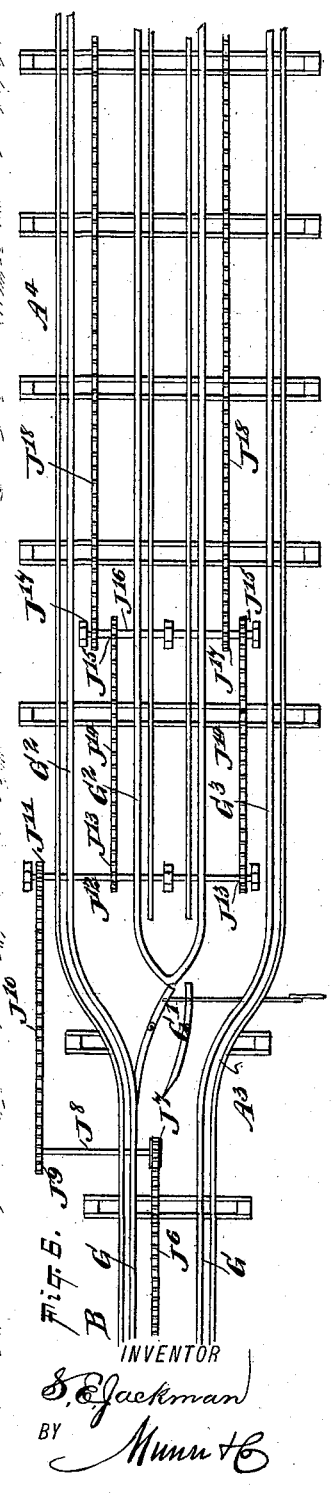
WITNESSES:
William P. Goebel
Theo. G. Hoster
INVENTOR
S. E. Jackman
BY Munn & Co.
ATTORNEYS.

(No Model.) 6 Sheets—Sheet 3.
S. E. JACKMAN.
INCLINED RAILWAY AND WATER TOBOGGANING APPARATUS.
No. 566,182. Patented Aug. 18, 1896.
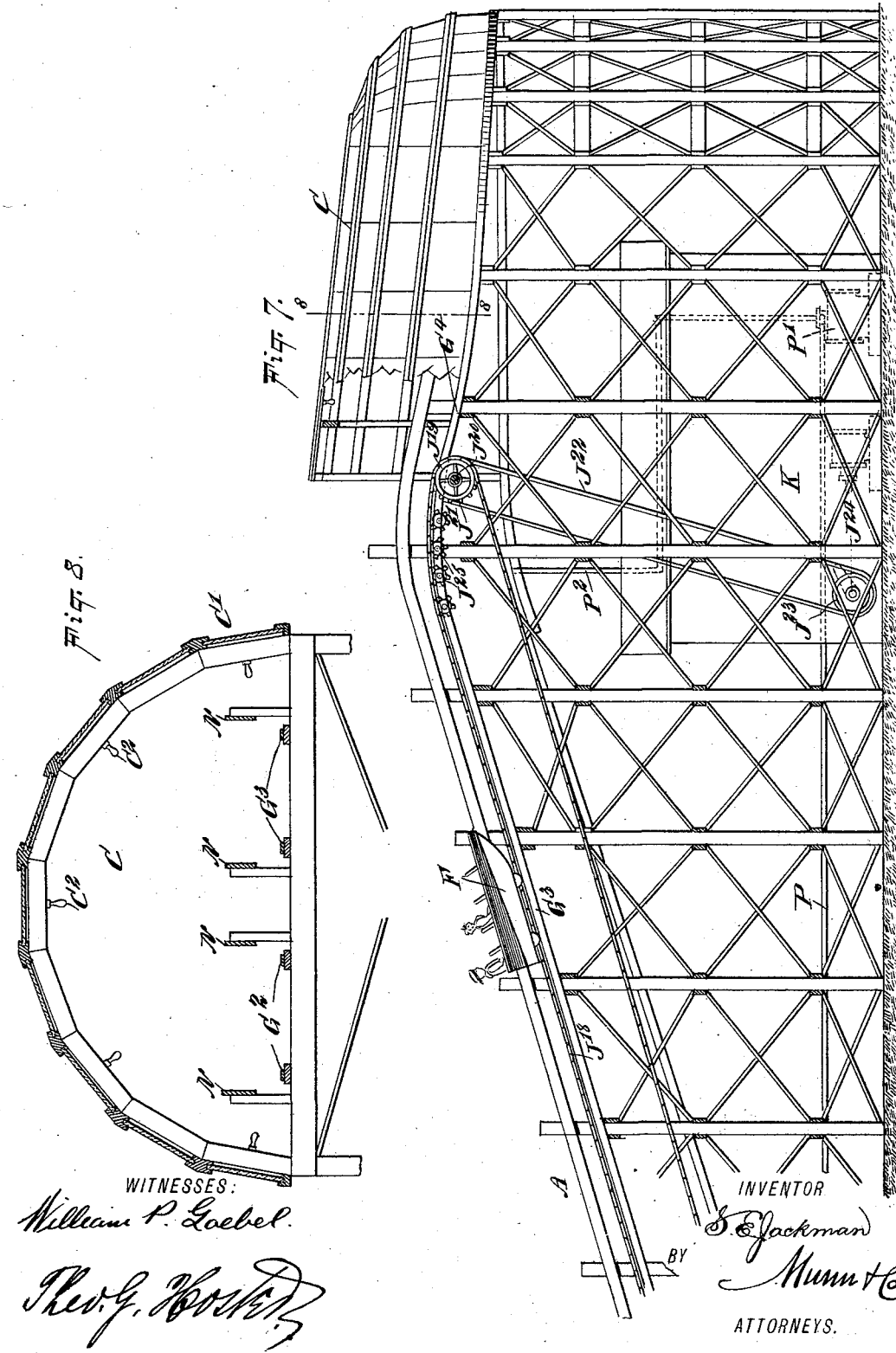
WITNESSES:
William P. Goebel.
Theo. G. Hoster.
INVENTOR
S. E. Jackman
BY Munn & Co.
ATTORNEYS.

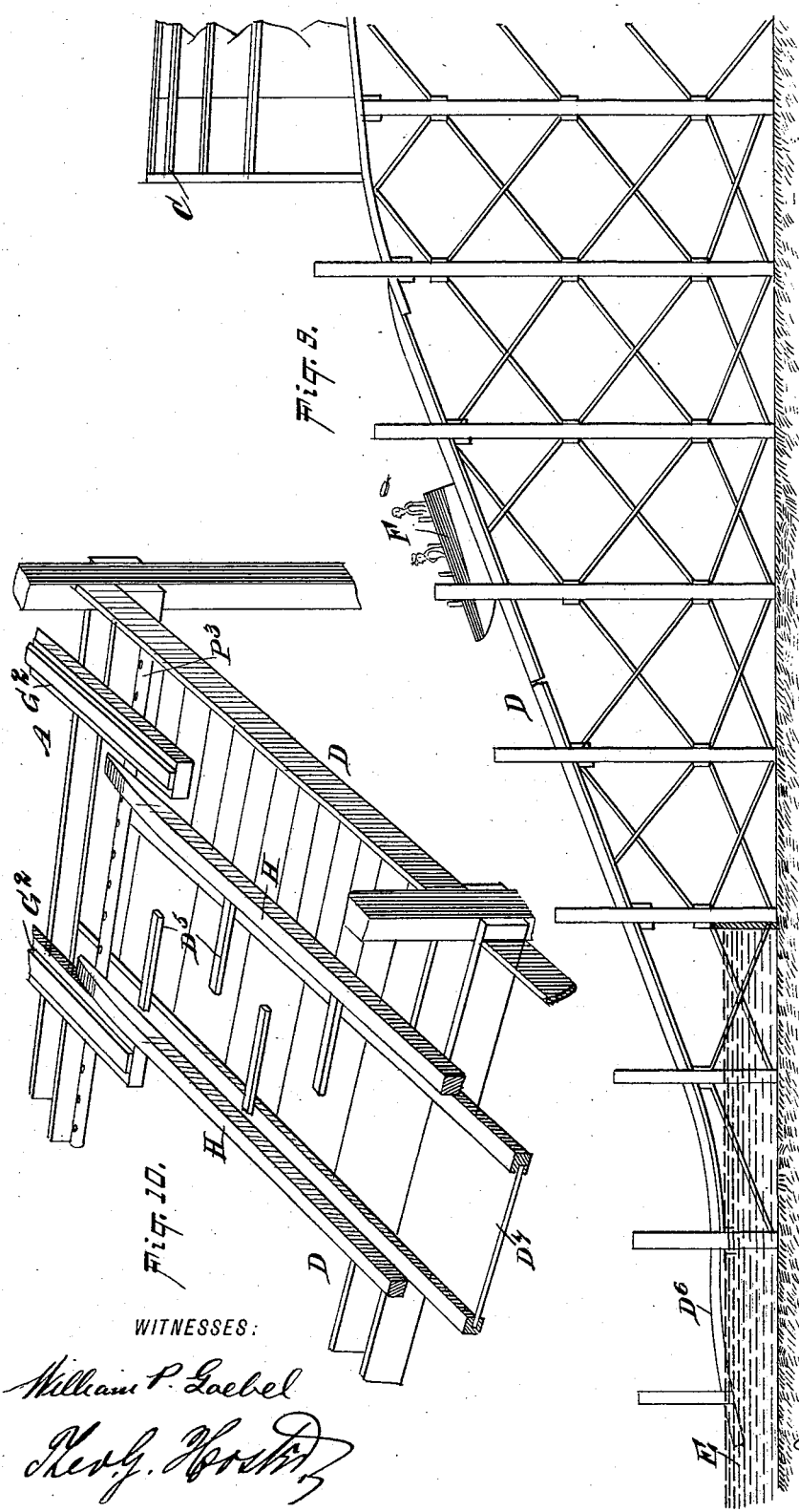

(No Model.) 6 Sheets—Sheet 5.
S. E. JACKMAN.
INCLINED RAILWAY AND WATER TOBOGGANING APPARATUS.
No. 566,182. Patented Aug. 18, 1896.
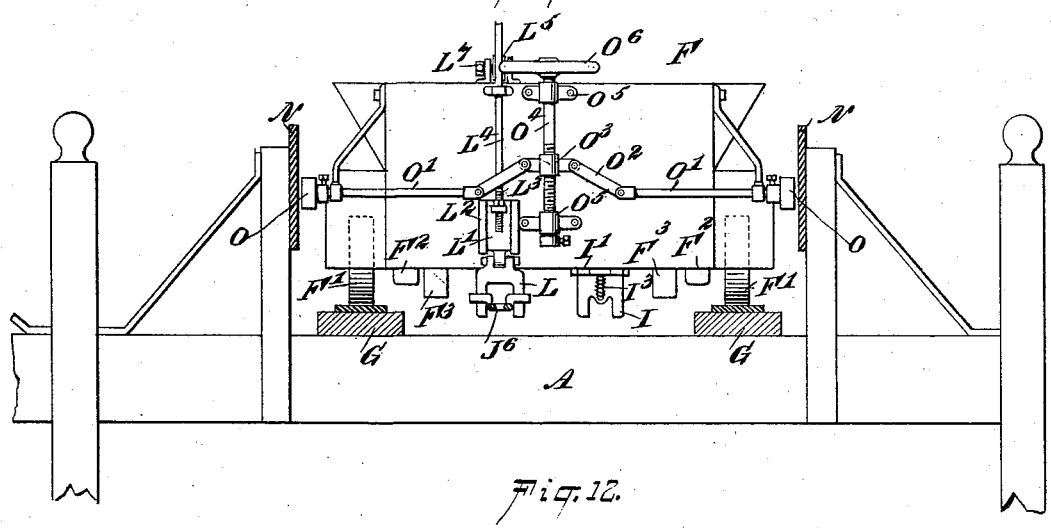
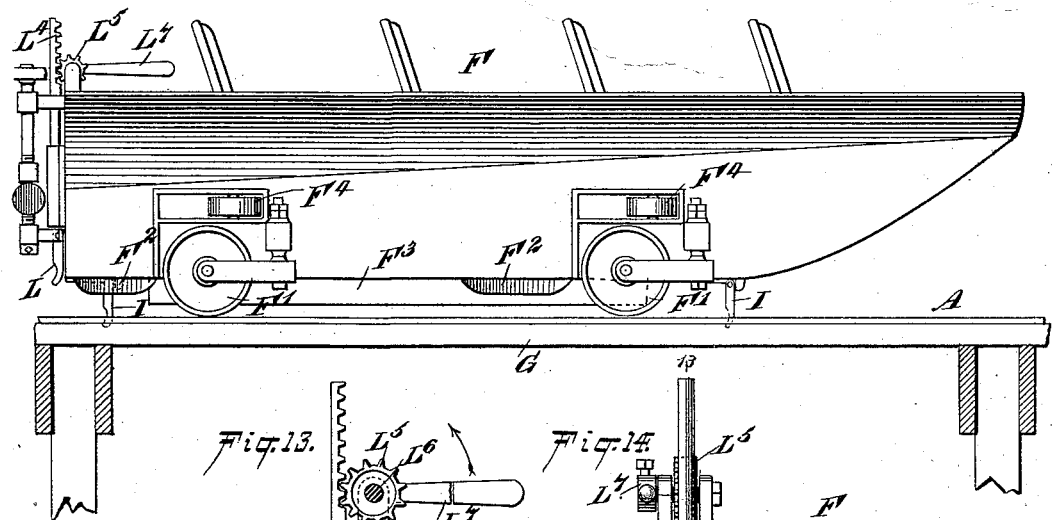
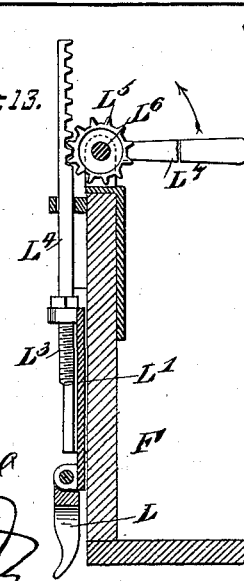
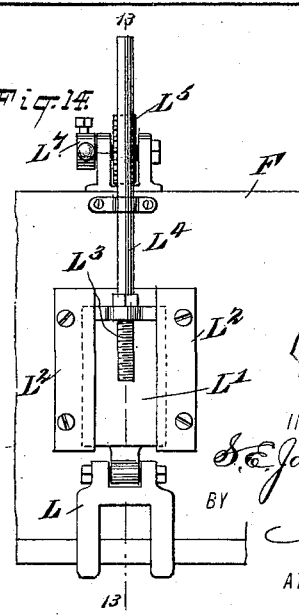
WITNESSES:
William P. Goebel
Geo. G. Hester
INVENTOR
S. E. Jackman
BY
Munn & Co.
ATTORNEYS.

(No Model.) 6 Sheets—Sheet 6.
S. E. JACKMAN.
INCLINED RAILWAY AND WATER TOBOGGANING APPARATUS.
No. 566,182. Patented Aug. 18, 1896.
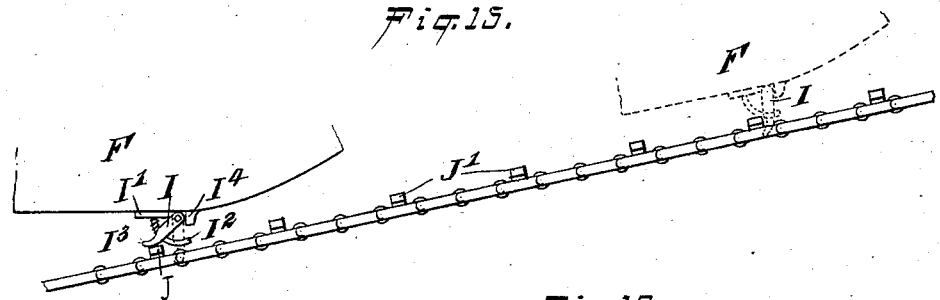
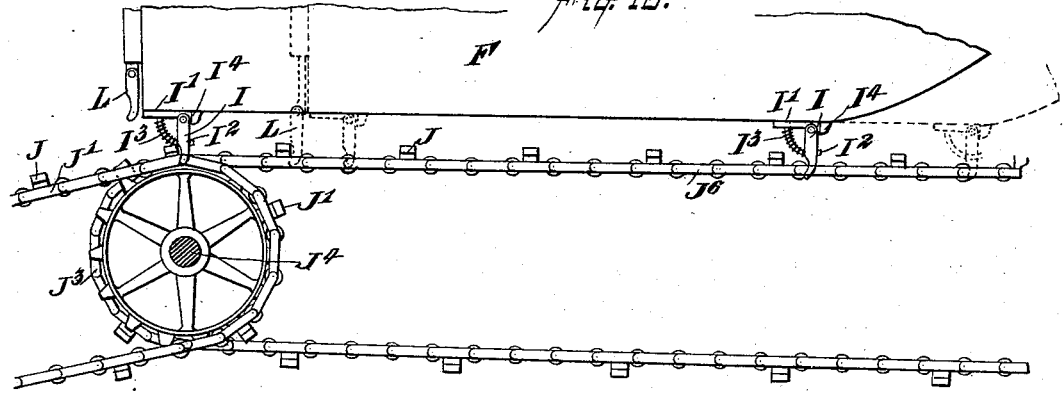
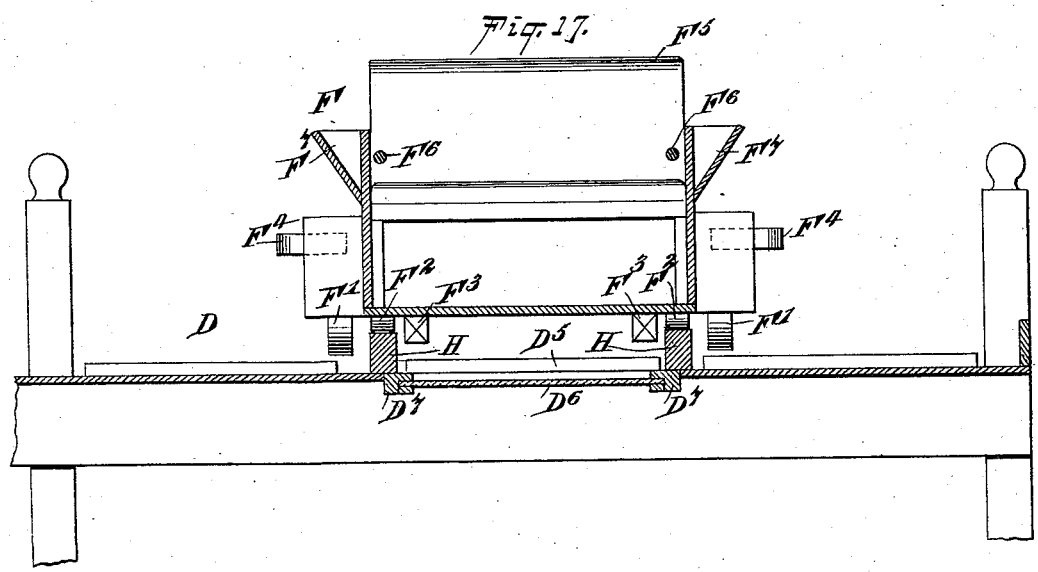
WITNESSES:
William P. Goebel
Theo. G. Hoster
INVENTOR
S. E. Jackman
BY Munn & Co
ATTORNEYS.

UNITED STATES PATENT OFFICE.

STEPHEN E. JACKMAN, OF BROOKLYN, NEW YORK.

INCLINED RAILWAY AND WATER TOBOGGANING APPARATUS.

SPECIFICATION forming part of Letters Patent No. 566,182, dated August 18, 1896.

Application filed September 9, 1895. Serial No. 561,973. (No model.)

*To all whom it may concern:*

Be it known that I, STEPHEN E. JACKMAN, of Brooklyn, (Coney Island,) in the county of Kings and State of New York, have invented a new and Improved Inclined Railway and Water Tobogganing Apparatus, of which the following is a full, clear, and exact description.

The object of the invention is to provide a new and improved inclined railway and water tobogganing apparatus arranged to enable persons to enjoy a continuous ride over an inclined or switchback road through a tunnel and down a toboggan-slide into a lake or like body of water and over the same back to the starting-point or station without being obliged to leave the vehicle.

The invention consists of certain parts and details and combinations of the same, as will be fully described hereinafter, and then pointed out in the claims.

Reference is to be had to the accompanying drawings, forming a part of this specification, in which similar characters of reference indicate corresponding parts in all the figures.

Figure 1 is a plan view of the improvement with the track-rails omitted. Fig. 2 is a side elevation of the same. Fig. 3 is an enlarged sectional side elevation of part of the water-basin and part of the inclined railway. Fig. 4 is a plan view of the same. Fig. 5 is an enlarged sectional side elevation of part of the inclined railway. Fig. 6 is a plan view of the same. Fig. 7 is a side elevation of the upper part of the inclined railway, tunnel, and water toboggan-slide. Fig. 8 is a cross-section of the tunnel. Fig. 9 is an enlarged side elevation of the end of the tunnel, the toboggan-slide, and the water-basin. Fig. 10 is a perspective view of the junction of the inclined railway and the slide. Fig. 11 is an enlarged cross-section of the inclined railway with the vehicle on the track. Fig. 12 is a sectional side elevation of the same. Fig. 13 is an enlarged sectional side elevation of the stern of the vehicle and mechanism for raising and lowering the catch. Fig. 14 is an end elevation of the same. Fig. 15 is an enlarged side elevation of the propelling-chain for the vehicle on the inclined railway. Fig. 16 is a like view of the same at the junction of the first incline and station portion of the inclined railway, and Fig. 17 an enlarged cross-section of the toboggan-slide and vehicle thereon.

The improved apparatus, as illustrated in Figs. 1 and 2, is provided with a continuous course formed by an inclined railway A, provided with a station B and leading at its upper end through a tunnel C to a water toboggan-slide D, terminating at its lower end in a water-basin E, preferably made in the shape of a horseshoe, leading at either end to the lower end of the inclined railway A, and having its rounded portion or end arranged so as to form a kind of guide to direct a boat or the like from the end of one of the inclined ways to the end of the other inclined ways, said inclined ways forming the inclined railway A, as will be readily understood by reference to Figs. 1 and 2. Thus a vehicle F, in the shape of a flat-bottomed boat and formed with wheels F' and with runners $F^2$, is adapted to travel over the said continuous track from the station A back to the latter without the persons seated in the vehicle once leaving the same.

The inclined railway A is preferably provided with a lower section A', extending at its lower end into the water contained in the basin E, so that the boat can readily travel over the surface of the water upon the said section A', to be then carried upward by the propelling mechanism on the inclined railway, as hereinafter more fully described. The upper end of the section A' is just above the water-level, as indicated in Fig. 3, to terminate in the station-section $A^2$, on which the station B is located, and the end of this station-section $A^2$ connects by a switch $A^3$ with the steep incline $A^4$, preferably provided with two tracks and terminating at its upper end in the tunnel C, which is inclined downward slightly to the upper end of the chute D.

The wheels F' of the vehicle F are adapted to travel on single-track rails G of the sections A' and $A^2$ of the inclined railway A, to then pass over the switch-rails G' to either of the track-rails $G^2$ or $G^3$ on the steep inclined portion $A^4$ of the inclined railway. (See Figs. 5 and 6.) Either of the track-rails $G^2$ or $G^3$ carries the vehicle F to the rails H or H', respectively, located in the parts D' and D² of the chute D, likewise made double, so as to accommodate a large number of vehicles.

It is understood that the runners F² on each vehicle F pass upon the rails H or H' whenever the wheels F' leave the track-rails G² or G³ at the end of the tunnel C, so that the vehicle, instead of traveling on its wheels, as it did up the inclined railway, now slides, by means of its runners F², on the rails H H', down the chute D into the water contained in the basin E.

The vehicle F is provided in its flat bottom at the front and at the rear with catches I, (see Figs. 15 and 16,) each pivoted on a bracket I', secured to the flat bottom, so that the catch hangs vertically and is adapted to engage one of a series of lugs J on endless chains forming part of the inclined railway, as hereinafter more fully described.

In order to guide each catch I, I provide a segmental arm I², projecting from the bracket I' and passing through an aperture in the catch, and a spring I³ is coiled on the said arm I² and presses on the catch I to positively hold the same in a vertical position, but at the same time permit the catch to swing rearwardly, as indicated at the left in Fig. 15, to pass over the lug J to the front thereof, so that the lug J engages the rear of the catch to pull the vehicle forward. The forward swinging motion of the catch I is limited by a stop I⁴ on the bracket I'.

The propelling device for engaging the catches I on each vehicle consists of a chain J', arranged in the lower incline A', and this chain J' passes at its lower end over a sprocket-wheel J², located near the bottom of the basin E, so that the lower part of this chain J' is completely submerged in the water. (See Fig. 3.) The upper end of the chain J' passes over a sprocket-wheel J³, secured on a transverse shaft J⁴ and arranged a short distance above the level of the water at the upper end of the first incline A'. The shaft J⁴ carries a second sprocket-wheel J⁵, (see Figs. 3 and 4,) over which passes a sprocket-chain J⁶, extending along the station-section A², and arranged slightly in an inclined direction forwardly and downwardly, the rear end of the chain passing over a sprocket-wheel J⁷, secured on a shaft J⁸. On this shaft J⁸ is secured a sprocket-wheel J⁹, over which passes a sprocket-chain J¹⁰, extending outside of the trestle-work and tracks along the switch-section A³, (see Figs. 5 and 6,) to pass over a sprocket-wheel J¹¹, secured on a shaft J¹², extending transversely at the lower end of the steep inclined section A⁴, as is plainly shown in Figs. 5 and 6.

On the shaft J¹² are secured two sprocket-wheels J¹³, one for each of the tracks G² and G³, and each sprocket-wheel J¹³ is connected by a chain J¹⁴ with a sprocket-wheel J¹⁵, secured on a transverse shaft J¹⁶, carrying sprocket-wheels J¹⁷, one for each track G² and G³. Over each of the sprocket-wheels J¹⁷ passes a sprocket-chain J¹⁸, extending upwardly in the steep inclined sections to pass at its upper end, at the entrance of the tunnel C, over a sprocket-wheel J¹⁹, secured on a transverse shaft J²⁰. (See Fig. 7.) On this shaft J²⁰ is fastened a pulley J²¹, over which passes the belt J²², also passing over a pulley J²³, secured on a shaft J²⁴, rotated from an engine or other suitable motor located in the engine-house K, as indicated in the said Fig. 7.

Now it will be seen that when the shaft J²⁴ is rotated a traveling motion is imparted to the several sprocket-chains J¹⁸, J¹⁴, J¹⁰, J⁶, and J', so that the vehicle F, passing on the chain J', is carried upward on the inclined railway-section A' to finally pass into the station-section A² to bring the vehicle to the station B for passengers to get out and other passengers to get in. By reference to Fig. 16 it will be seen that two catches I are necessary to bring the vehicle F from the first section A' onto the second section A², as the said catch I on the forward end of the vehicle, after leaving the chain J', does not come in contact with the chain J⁶, as the latter is not in alinement with the chain J', and consequently the rear catch I is necessary to push the vehicle F completely upon the second section A². When this is done, both catches I are out of engagement with the chain, and in order to propel the vehicle forward the attendant in the boat throws down another catch L to engage the lug J' on the chain J⁶. This catch L is shown in detail in Figs. 13 and 14 and is arranged as follows: The catch L is pivoted at its upper end on a slide L', fitted to slide vertically in suitable guideways L², attached to the rear end of the vehicle F, and the said slide is engaged by the lower threaded end L³ of a rack L⁴ in mesh with a gear-wheel L⁵, secured on a shaft L⁶, journaled in suitable bearings on the top of the end of the boat. A handle L⁷ is fastened to the shaft L⁶ and is under the control of the attendant of the vehicle, stationed in the stern. Now it will be seen that the catch L, when in its uppermost position, as shown in Fig. 13, is above the chains, and when the vehicle F passes onto the station-section A² then the attendant, by moving the handle L⁷ upward, causes the downward movement of the rack L⁴, slide L', and catch L to bring the latter in engagement with one of the projections of the traveling chain J⁶. The vehicle F is now propelled forward to the station by the chain J⁶, and when at or near the station B the attendant moves the handle L⁷ back into its uppermost position (shown in Fig. 13) to withdraw the catch L from the lug J' of the chain J⁶. The vehicle now comes to a standstill to permit passengers to get out and to take on other passengers, after which the attendant again throws the catch L down to cause the chain J⁶ to move the vehicle F forward to the switch G', on which the vehicle is transferred to either of the tracks G² or G³, it being understood that the momentum of the vehicle is sufficient to carry it from the end of the chain $J^6$ to either of the chains $J^{18}$. The vehicle now travels up the inclined-railway section $A^4$, the propelling being done by the chain $J^{18}$ engaging the catch L. When the vehicle arrives and passes over the upper end of the section $A^4$, it passes onto the track-rails $G^4$ and $G^3$ in the tunnel C, and, as the said track-rails are inclined downward, the vehicle, by its own momentum, shoots through the tunnel C to finally pass upon the corresponding section $D'$ or $D^2$ of the chute D. In doing so the wheels $F'$ pass out of action and the runners $F^3$ pass on the rails H or $H'$.

In order to enable the attendant to control the vehicle F, a suitable mechanism is provided, likewise under the control of the attendant. Throughout the course of the inclined railway, in the tunnel C and chute D, and on both sides thereof, are arranged the guard-rails N, (see Fig. 11,) adapted to be engaged by wheels $F^4$ on the sides of the vehicle F to reduce the friction incident to the vehicle swaying from one side to the other and the wheels striking the said rails N. The rails are also adapted to be engaged by brake-shoes O, fitted to slide transversely in suitable bearings attached to the vehicle F, (see Figs. 11 and 12,) and these brake-shoes are pivotally connected on their brake-rods $O'$ by links $O^2$ with a nut $O^3$, screwing on a screw-rod $O^4$, mounted to turn in bearings $O^5$, secured to the rear end of the vehicle F. On the upper end of the screw-rod $O^4$ is arranged a hand-wheel $O^6$, under the control of the attendant, so that the latter by turning the said hand-wheel and screw-rod $O^4$ causes the nut $O^3$ to move downward to force the links $O^2$ outward, and consequently the brake-shoes O in engagement with the rails N, to bring the vehicle to a stop whenever necessary, especially at the station B.

The vehicle F is provided with suitable seats $F^5$ for the passengers and with hand-rails $F^6$, extending longitudinally, for enabling the passengers to hold on while passing over the course. On the sides of the vehicle F are dashboards $F^7$ for preventing the water from passing upon the occupants of the vehicle at the time the latter strikes the water in the basin. The tunnel C is preferably covered with glass $C'$, as indicated in Fig. 8, and is illuminated by electric or other lamps $C^2$.

The chute D has its bottom preferably made of strips $D^7$, holding plates $D^6$, of colored glass, with lamps below, so that the water when passing down the said chute is illuminated to the color of the said bottom, owing to the reflection of the light through the glass. In the chute D are secured transversely-extending and alternately-arranged strips $D^5$, Fig. 17, so that the water passing down the chute is broken up to form ripples, so as to heighten the effect.

The water is taken from the basin by a pipe P, leading to a pump $P'$ in the engine-house K, to be then pumped up through a perforated and transverse pipe $P^3$, arranged in the upper end of the chute D. (See Figs. 7 and 10.) The water passing out of this perforated pipe $P^3$ flows down the chute D and over the arms $D^5$ to cause the ripples, as previously explained, it being, however, understood that the water is not sufficiently deep in the chute to strike the bottom of the boat. The lower end of the chute D is curved, as at $D^6$, so that the vehicle F, in traveling down, strikes the water gently to retain as much momentum in the vehicle as possible to cause the latter to float over the water in the basin E from the lower end of the chute back to the lower end of the section $A'$ of the inclined railway. The vehicle, while traveling over the water in the basin E, is readily steered by the attendant either leaning to one side of the boat or by a special paddle or rudder. (Not shown.) The vehicle thus passes readily into the lowermost end of the section $A'$, it being understood that in doing so the forward catches I on the vehicle F engage one of the lugs J of the chain $J'$ to propel the vehicle up the section $A'$ onto the station-section $A^2$, along which the attendant manipulates the catch L to bring the vehicle finally to the station.

By having the switch $G'$ and the two tracks $G^2$ and $G^3$, as well as the two sections in the chute D, I am enabled to send a large number of vehicles over the course at one time, it being understood that the vehicles are then alternately sent by the switch $G'$ to either of the tracks $G^2$ or $G^3$. The safety-beams $F^3$ on the under side of the vehicle F prevent displacement of the vehicle while going down the chute D, and in case the boat should go too fast through the tunnel, or one of the chains should break, then the attendant can apply the brake mechanism and reduce the speed of the vehicle and securely hold it in position.

It is understood that by the arrangement described a continuous course is formed, and passengers getting in the vehicle at the station B are taken around the entire course without once alighting, and if a second ride is desired they remain in the vehicle to again go over the course, as above described. It is understood that for each ride over the course a toll is paid at the station B.

Having thus fully described my invention, I claim as new and desire to secure by Letters Patent—

1. In an apparatus of the class described, the combination with a vehicle in the form of a boat and having track-wheels and runners, of a continuous course over which is adapted to pass the said vehicle, the said course comprising an inclined railway, a toboggan-slide, a water-basin into which leads the said slide and which extends to the beginning of the said inclined railway, so that the vehicle coming down the slide passes over the water in the basin to and up the said inclined railway, and a tunnel interposed between the upper end of the inclined railway and the upper end of the said toboggan-slide, the tunnel being inclined downwardly from the railway to the toboggan-slide, substantially as shown and described.

2. In an apparatus of the class described, the combination with a vehicle in the form of a boat and having track-wheels and runners, of a continuous course over which is adapted to pass the said vehicle, the said course comprising an inclined railway, a toboggan-slide, and a water-basin into which leads the said slide and which extends to the beginning of the said inclined railway, so that the vehicle coming down the slide passes over the water in the basin to and up the said inclined railway, the said inclined railway being made in sections, of which the lower section extends from the water in the basin to above the level of the water, to terminate in a station-section for the passengers in the vehicle to get on or off the same, substantially as shown and described.

3. In an apparatus of the class described, the combination with a vehicle in the form of a boat and having track-wheels and runners, of a continuous course over which is adapted to pass the said vehicle, the said course comprising an inclined railway, a toboggan-slide, a water-basin into which leads the said slide and which extends to the beginning of the said inclined railway, so that the vehicle coming down the slide passes over the water in the basin to and up the said inclined railway, the said inclined railway being made in sections, of which the lower section extends from the water in the basin to above the level of the water, to terminate in a station-section for the passengers in the vehicle to get on or off the same, and a switch for connecting the station-section with the steep inclined section of the said railway, as set forth.

4. An apparatus of the class described, provided with a water-chute having its bottom made of translucent material, and lamps for illuminating the under side of the said bottom, substantially as shown and described.

5. An apparatus of the class described, provided with an inclined railway having propelling-chains with lugs, and a vehicle adapted to travel on the said railway and having a catch under the control of the attendant, adapted to be thrown in or out of engagement with the lugs on the said chain, said catch having a forked end adapted to embrace the chain in position to engage the lugs thereon with its forks, substantially as shown and described.

6. In an apparatus of the class described, the combination with a vehicle in the form of a boat and having track-wheels and runners, of a continuous course comprising an inclined railway having propelling-chains and rails for the said vehicle, a toboggan-slide having rails adapted to be engaged by the said runners of the vehicle, a water-basin into which leads the lower, curved end of the said slide and which extends to the beginning of the said inclined railway, and a brake mechanism on the said vehicle, and adapted to engage guard-rails on the inclined railway, substantially as shown and described.

7. An apparatus of the character described provided with a continuous course comprising an inclined railway, an inclined slide and a water-basin at the foot of said inclined railway, the ends of the inclined ways of said railway and slide being arranged adjacent to opposite sides of said basin and adapted to receive and deliver a boat or the like passing over said course into said basin, the edges of said basin being curved and arranged to guide such boat from the end of one inclined way to the end of the other inclined way, substantially as specified.

8. An apparatus of the character described having a continuous course comprising an inclined railway, provided with double tracks, a water-basin arranged at the foot of the inclined railway and adapted to receive a boat or the like, passing over the course, and a station-section arranged to receive such boat or the like from said basin, and deliver the same to the ascending tracks, substantially as specified.

9. An apparatus of the character described having a continuous course comprising an inclined railway provided with double tracks, a water-basin at the foot of the railway adapted to receive a boat or the like passing over the course, and a single-track station-section arranged to receive such boat or the like from the basin and deliver the same to either one of the ascending tracks, substantially as specified.

10. An apparatus of the character described having a course comprising an inclined ascending track, a slide, and a water-basin to receive a boat or the like passing down the slide, means to propel a boat or the like up the same, a station track-section at the foot of the ascending track and arranged to deliver to the same, and means for propelling the boat or the like to the station-section, said station-section having its end adjacent to the foot of the ascending track inclined downward, substantially as specified.

11. An apparatus of the character described having a course comprising double ascending tracks, means to propel a boat or the like up the same, a station-section having a single track arranged to deliver a boat or the like to the lower end of either of the ascending tracks, a switch between the ascending tracks and the station-section, and means for propelling a boat or the like on the station-section, said station-section having its end adjacent to the switch inclined downward, substantially as specified.

STEPHEN E. JACKMAN.

Witnesses:
THEO. G. HOSTER,
C. SEDGWICK.